United States Patent

Nagatsuna et al.

Patent Number: 6,127,012
Date of Patent: *Oct. 3, 2000

[54] RECYCLABLE ARTICLE AND SHEET-LIKE MEMBER INCLUDED THEREIN

[75] Inventors: Shinji Nagatsuna, Tokyo; Tatsuo Tani, Chiba; Shunichi Ogawa, Kanagawa, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,080

[22] Filed: Aug. 29, 1997

[30] Foreign Application Priority Data

Aug. 31, 1996 [JP] Japan .................................. 8-248990
Jul. 16, 1997 [JP] Japan .................................. 9-207061

[51] Int. Cl.[7] .............................. B32B 33/00; B32B 7/02; B32B 7/12; B32B 15/04
[52] U.S. Cl. .................. 428/40.1; 428/41.8; 428/42.1; 428/42.3; 428/212; 428/343; 428/345; 428/352; 428/903.3; 428/914
[58] Field of Search ................... 428/40.1, 41.8, 428/42.1, 42.3, 411.1, 903.3, 914, 212, 343, 345, 352

[56] References Cited

U.S. PATENT DOCUMENTS

| | | | |
|---|---|---|---|
| 3,193,424 | 7/1965 | Scott | 156/73 |
| 4,890,763 | 1/1990 | Curiel | 220/455 |
| 5,031,773 | 7/1991 | Manico et al. | 206/455 |
| 5,412,035 | 5/1995 | Schmitt et al. | 525/93 |
| 5,620,794 | 4/1997 | Burkart et al. | 428/343 |
| 5,622,761 | 4/1997 | Cole | 428/41.9 |

FOREIGN PATENT DOCUMENTS 8-34088 2/1996 Japan .

*Primary Examiner*—Paul Thibodeau
*Assistant Examiner*—Holly C Rickman
*Attorney, Agent, or Firm*—Oblon, Spivak, McClelland, Maier & Neustadt, P.C.

[57] ABSTRACT

A recyclable article and a sheet-like member included in the article are disclosed. In a copier, for example, a front door has a door body and a decal fitted on the door body by an adhesive. The door body and decal are formed of thermoplastic resins soluble in each other, so that the adhesive does not remain on the door body when the decal is peeled off the door body. When the front door is melted for recycling, a molding having desirable characteristic is achievable. When the decal is peeled off the door body in order to reuse the front door, the adhesive can be easily removed from the door body.

21 Claims, 6 Drawing Sheets

RECYCLABLE ARTICLE AND SHEET-LIKE MEMBER INCLUDED THEREIN

BACKGROUND OF THE INVENTION

The present invention relates to a recyclable article and a sheet-like member included in the article.

A great number of articles each having a first and a second part adhered together by an adhesive are used in, e.g., copiers, facsimile apparatuses, printers, word processors, personal computers and other office equipments, television sets, video tape recorders and other equipments for public use, buildings, railroads, ships, and toys.

A copier, for example, is made up of various kinds of articles including a casing, a front door and image forming devices arranged within the casing. These articles each have a first part and a second part. The front door, for example, has a door body and a sheet-like member adhered to the door body and usually called a decal. The door body and decal are the first part and second part, respectively. The decal is a sheet-like piece implemented as, e.g., a resin sheet, resin film or thin flexible or rigid resin plate. Necessary information are printed on the decal or can be entered later. The decal is adhered to, e.g., the surface of the casing or that of a toner cartridge and is extensively used with equipments other than copiers as well. The casing of the copier has a casing body and a sound-absorbing sheet-like member adhered to the casing body and formed of a foam material. In this case, the casing body and sound-absorbing member are the first part and second part, respectively. An article made up of a first and a second part sometimes constitutes a single product alone.

Today, there is an increasing demand for recyclable products in order to further promote the protection of environment and the saving of limited resources. To meet this demand, it is necessary to recycle and reuse as far as possible the parts of a disused product, e.g., electronic equipment or automotive vehicle. In this respect, the article consisting of a first and a second part, as stated earlier, should preferably be formed of a thermoplastic resin. When such an article is disused, it can be, e.g., shredded into pellets, melted by heat, and then molded to produce another article.

The problem with the above recycling scheme is as follows. Assume that the first and second parts constituting the article are formed of different materials. Then, when the article is bodily shredded and melted, the materials of the two parts do not dissolve in each other and are apt to deteriorate the mechanical strength and other characteristics of an expected molding. For example, should the door body or first part and the decal or second part of the front door of the copier be formed of materials far different in property from each other, a molding produced by shredding and melting the two parts would have characteristics deteriorated too much to implement a new door body.

In light of the above, an article whose first and second parts are formed of thermoplastic resins soluble in each gather is proposed in Japanese Patent Laid-Open Publication No. 8-34088. This kind of article can be shredded, melted and then molded with the first and second parts adhered together, preventing the characteristics of an expected molding from being deteriorated. In addition, recycling the article without separating the first and second parts reduces the cost.

However, our extended researches on the recyclability of various kinds of products showed that the approach taught in the above document cannot promote smooth recycling alone, as follows.

Recycling a certain article refers not only to shredding and melting the article for producing a new molding, but also to reusing, if the article is free from noticeable damage or contamination, the article without shredding or melting it. Again, consider the front door of the copier. If the door body of the front door is still usable when the copier is disused and collected, then it is reused as a front door. Specifically, the decal of the front door is peeled off the door body because it is usually discolored or otherwise damaged due to, e.g., aging. Then, the door body is cleaned and, if necessary, reconditioned. Subsequently, a new decal is adhered to the clean door body in order to reuse the front cover. That is, the second part is separated from the first part, and then a new second part is fitted on the first part by an adhesive.

Let using a certain article again without shredding or melting it be referred to as "reusing", as distinguished from "recycling" involving shredding and melting. When a certain article is collected, it is preferable to determine whether the article should be reused or recycled, depending on its degree of contamination and damage as well as its history of use. This is because reusing an article without shredding or melting is practicable with less energy and cost, yet with a higher efficiency, than recycling. If the article is critically damaged or repeatedly used in the past, it is shredded and melted in order to produce a new molding.

To recycle the disused article, the first and second parts constituting it are formed of thermoplastic resins soluble in each other in order to provide a new molding with desirable characteristics, as stated earlier. However, the problem is that when the second part is removed from the first part, the adhesive is apt to remain on the first part in a great amount. Specifically, because the adhesive between the first and second parts soluble in each other exerts substantially the same adhesion force on the two parts, the adhesive either partly or almost entirely remains on the first part at the time of removal of the second part.

Assume that the first part on which the adhesive is left is simply cleaned, and then a new second part is fitted on the first part by an adhesive. Then, it is likely that the adhesive left on the first part reduces the adhesion force to act on the new second part and degrades the appearance of the resulting article. For example, assume that the decal or second part is peeled off the door body or first part while leaving a great amount of adhesive on the door body, and then a new decal is adhered to the door body. Then, the adhesive remaining on the door body lowers the adhesion force to act on the new decal, and in addition causes the surface of the new decal to rise and thereby deteriorates the appearance to a critical degree. Even when the first part from which the second part has been removed is reused without any new second part, the adhesive remaining on the first part degrades the appearance of the article.

Therefore, the adhesive left on the first part at the time of separation of the second part must be removed by, e.g., hand. However, the adhesive exerting a great adhesion force even on the first part, as stated previously, cannot be easily removed from the first part. This results in time- and labor-consuming work and increases the overall recycling cost.

SUMMARY OF THE INVENTION

It is therefore an object of the present invention to provide a recyclable article capable of being melted to produce a new molding without noticeably deteriorating the characteristics of the molding, and capable of being easily reused, and a sheet-like member included in the article.

In accordance with the present invention, a recyclable article has a first part, and a second part adhered to the first part by an adhesive. The first and second parts are formed of thermoplastic resins soluble in each other. The adhesive is of the kind reducing its adhesion force acting on the first part when subjected to at least one of heat and an electromagnetic wave.

Also, in accordance with the present invention, a recyclable article has a first part, and a second part adhered to the first part by an adhesive. The first and second parts are formed of thermoplastic resins soluble in each other. The adhesive is made up of a first and a second adhesive layer adhering to the first and second parts, respectively. The first adhesive layer is of the kind reducing its adhesion force acting on the first part when subjected to at least one of heat and an electromagnetic wave.

Further, in accordance with the present invention, a recyclable article has a first part, a second part adhered to the first part by an adhesive, and an adhesion force reducing device for reducing an adhesion force acting between the first part and the adhesive. The first and second parts are formed of thermoplastic resins soluble in each other.

Furthermore, in accordance with the present invention, a recyclable part has a first part, a second part adhered to the first part by an adhesive, and an adhesion force increasing device for increasing an adhesion force acting between the second part and the adhesive. The first and second parts are formed of thermoplastic resins soluble in each other.

Moreover, in accordance with the present invention, a recyclable article has a first part, and a second part adhered to the first part by an adhesive. The first and second parts are formed of thermoplastic resins soluble in each other. The adhesive exists only in a part of the surface of the first part and the surface of the second part contacting each other.

In addition, in accordance with the present invention, in a sheet-like member to be adhered to a part formed of a thermoplastic resin, an adhesive whose adhesion force acting on the part decreases when subjected to at least one of heat and an electromagnetic wave is adhered to the surface of the sheet-like member to be adhered to the part.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
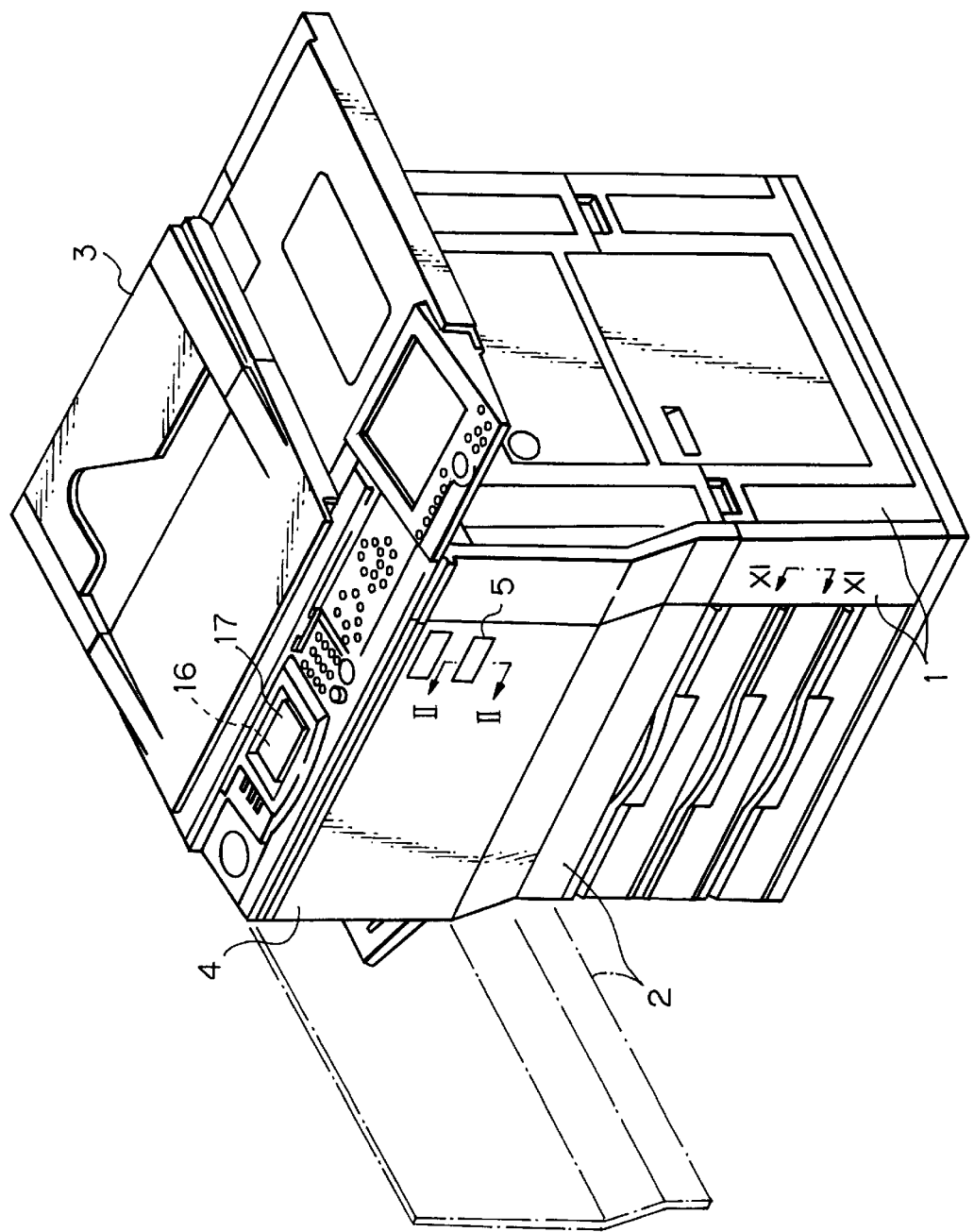
FIG. 1 is a perspective view showing the appearance of a copier to which the present invention is applicable.

Referring to FIG. 1 of the drawings, a copier which is a specific form of an electronic apparatus is shown. As shown, the copier 1 includes a casing 1, a front door 2 openably hinged to a frame, not shown, included in the casing 1, and a cover plate 3 mounted on the top of the copier for pressing a document from the above. Other various articles including image forming elements are arranged in the copier. Many of such articles are implemented as recyclable articles each consisting of a first part and a second part adhered to the first part. A preferred embodiment of the present invention will be described, taking the front door 2 as an example.

Figure 2:
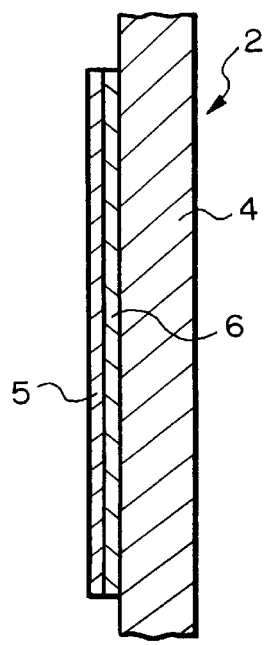
FIG. 2 is an enlarged section along line II—II of FIG. 1.
Figure 3:
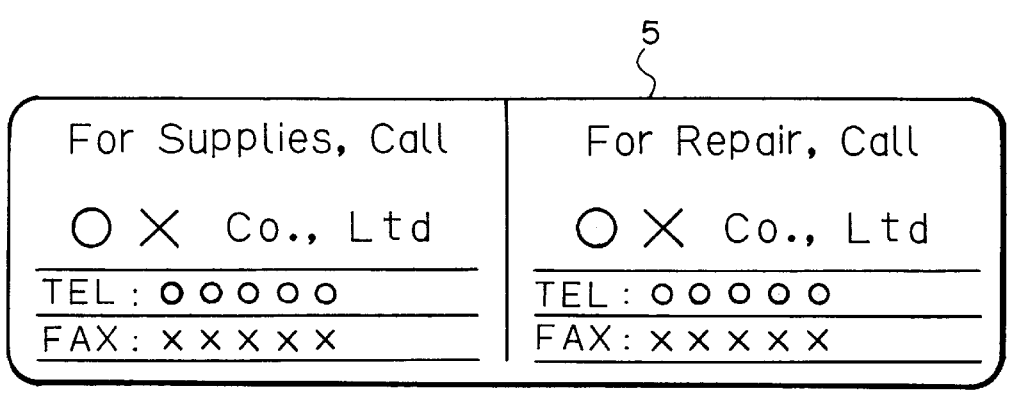
FIG. 3 shows a decal included in the copier of FIG. 1.

The front door 2 is hinged to the frame of the copier in such a manner as to be movable between a closed position and an open position respectively indicated by a solid line and a dash-and-dot line in FIG. 1. The front door 2 is made up of a door body 4 formed of a thermoplastic resin, and at least one decal adhered to the door body 4. As shown in FIGS. 2 and 3, the decal 5 is a flexible or rigid sheet-like member implemented by, e.g., a resin sheet, resin film or thin resin plate. Preselected image information for the user of the copier or a serviceman are printed on the surface of the decal 5. For example, a distributor of supplies and a service station for repair are printed on the decal 5, as shown in FIG. 3. The image information may be provided in the form of characters, arrows or similar symbols, figures, or colors, as needed. Further, the decal 5 may be so configured as to allow the user or the serviceman to enter necessary information. The decal 5 is fitted on the door body 4 by an adhesive 6.

As stated above, the front door or recyclable article 2 is made up of the door body or first part 4 and the decal or second part adhered to the door body 4 by the adhesive 6. The adhesive 6 covers all the possible kinds of adhesives including adhesives themselves, pressure sensitive adhesives, adhesive films provided between two members and adhering them together when heated and pressed, and two-sided adhesive sheets each consisting of a sheet-like base and adhesive layers provided on both sides of the base. The adhesive intervenes between and firmly adheres the first and second parts, but allows them to be separated from each other when subjected to an external force.

When the copier shown in FIG. 1 is disused and collected from the user's station, recyclable parts included in the copier are recycled. The front door 2, for example, is shredded into pellets sized 5 mm square or so, melted by heat, and then reclaimed as some desired molding. To enhance the characteristics of the molding, e.g., bending strength, impact strength and other mechanical properties, the door body or first part 4 and the decal or second part 5 are formed of thermoplastic resins soluble in each other. Therefore, even when the door 3 with the decal 5 adhered to the door body 4 is shredded and melted, the resins constituting the door body 4 and decal 5 easily dissolve in each other. The resulting molding sufficiently withstands practical use.

Generally, the body of the casing 1 or the door body 4 of the front door 2 is, in many cases, formed of PS (polystyrene), modified PPE(polyphenylene ether), ABS (acryl butadien styrene) or similar thermoplastic resin. The decal 5 to be adhered to such a door body 4 should preferably be formed of any one of the following specific resins.

When the door body 4 is formed of PS, the decal 5 may advantageously be formed of PC (polycarbonate) or PMMA (metacrylic resin) soluble in PS or may also be formed of PS. When the door body 4 is formed of modified PPE, the decal 5 may advantageous be formed of PS, PET (polyethylene terephthalate), ABS, PC or PMMA soluble in PPE or may also be formed of PPE. Further, when the door body 4 is formed of ABS, the decal 5 may advantageously be formed of PS, PET, PC or PMMA soluble in ABS or may also be formed of ABS. In addition, when the door body 4 is formed of PPO (polyphenylene oxide), the decal 5 may advantageously be formed of PS or ABS soluble in PPO or may also be formed of PPO.

The door body 4 and decal 5 formed of the above specific thermoplastic resins can be shredded, melted and then molded without the decal 5 being peeled off the door body 4. The resulting molding achieves a mechanical strength (bending strength and impact strength) and other characteristics comparable with those of the original parts. Reclaiming the front door 2 without peeling off the decal 5 reduces the recycling cost and therefore the cost of the recycled molding.

The thermoplastic resin constituting the first part, e.g., door body 4 and the thermoplastic resin constituting the second part, e.g., decal 5 are soluble in each other, as stated above. This means that the two thermoplastic resins are soluble in each other to such a degree that the resulting molding attains characteristics withstanding actual use.

On the other hand, assume that the collected part, e.g., front door 2 is not noticeably damaged and not frequently recycled in the past. Then, it is possible to reuse the door 2 as a new front door by removing the decal or second part 5 from the door body or first part 4, cleaning or otherwise recycling the door body 4, and then adhering a new decal to the door body 4. The decal removed from the door body 4 is usually discarded. The front door 2 may be recycled alone or together with any other part, e.g., casing 1, i.e., without being separated from the casing 1.

Examples to be described, particularly a first to a fourteenth example, share the above basic configuration.

The problem with the adhesive 6 is that it is apt to remain on the surface of the door body or first member 4 in a great amount when the decal or second part 5 is separated from the body 4. This is because the adhesive connecting the two parts 4 and 5 formed of thermoplastic resins soluble in each other adheres to both of them with substantially the same adhesion force. Should a new decal be adhered to such a recycled door body 4, it would degrade the appearance of the recycled door body 4 and would have its adhesion force reduced. It is therefore necessary to remove the adhesive remaining on the door body 4 and then adhere a hew decal 5 to the body 4. However, removing the residual adhesive from the door body 4 is extremely time- and labor-consuming and increases the recycling cost.

Figure 4:
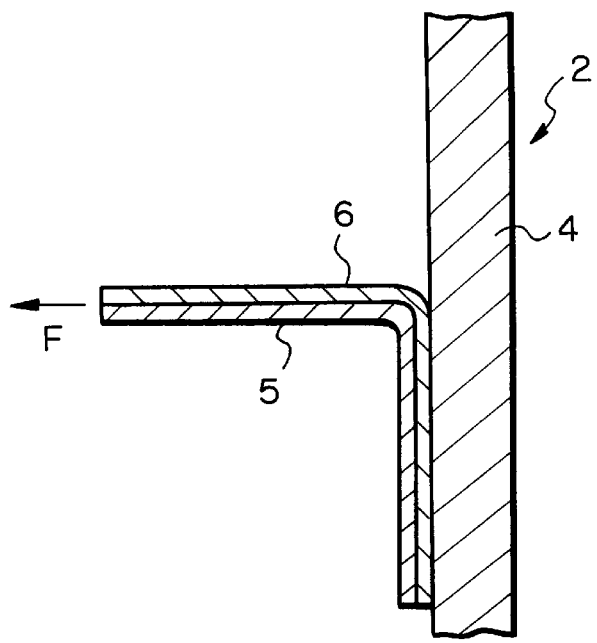
FIG. 4 is a section showing how the decal of FIG. 3 is peeled off a door body included in the copier.

The above problem will be solved if the material constituting the adhesive 6 at least substantially does not remain on the door body or first part when the decal or second part 5 is separated from the body 4. FIG. 4 shows the decal 5 being peeled off the door body 4 by a force F acting on the decal 5. As shown, the adhesive 6 should advantageously remain on the decal 5, but not on the door body 4, when the decal 5 is peeled off the body 4. This kind of adhesive 6 obviates the troublesome work for removing the adhesive 6 from the door body 4 and thereby reduces the recycling cost. The illustrative embodiment is based on such a technical concept.

In practice, however, preventing the entire adhesive 6 from remaining on the first part when the first and second parts are separated from each other is not practicable; microscopically, the adhesive 6 remains on the first part in a small amount. This condition is represented by the words "the adhesive 6 at least substantially does not remain on the door body or first part" mentioned above. Specifically, the words "substantially does not remain" may safely be said to refer to a condition wherein the adhesive left on the first part is not visible or a condition wherein although some adhesive is left on the first part, the appearance of the first part is not degraded when a new second part is adhered thereto.

The above condition is achievable if the adhesive 6 has such a characteristic that its adhesion force acting on the door body or first part 4 decreases when subjected to at least one of preselected heat and a preselected electromagnetic wave (e.g. ultraviolet rays). This is a first example of the illustrative embodiment.

Figure 5:
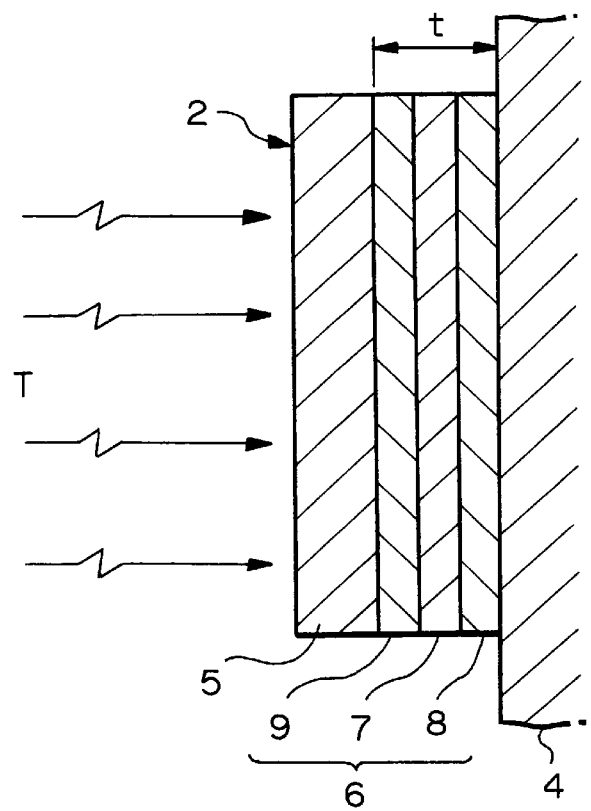
FIG. 5 is a section showing an adhesive of the kind reducing its adhesion force acting on the door body when subjected to heat.

As shown in FIG. 5, in the first example, the adhesive 6 is implemented as a two-sided adhesive sheet consisting of a sheet-like substrate 7 and a first and a second adhesive layer 8 and 9 respectively formed on opposite sides of the substrate 7. For the substrate 7, use may be made of a piece of unwoven cloth. The first and second adhesive layers 8 and 9 adhere to the door body or first part 4 and decal or second part 5, respectively. While both the first and second adhesive layers 8 and 9 are implemented by, e.g., acrylic pressure sensitive adhesives, the adhesive layer 8 contains a foaming agent. The adhesive 6 has a thickness t of, e.g., 0.17 mm and is commercially available as Thermopeel TP-5104 (trade name) from Nitto Denko Corp. (Japan).

Specifically, as shown in FIG. 5, heat of about 90° C. is applied to the front surface of the decal 5 by a drier or the like, not shown, as indicated by arrows T. As a result, the foaming agent contained in the first adhesive layer 8 foams and sharply reduces its adhesion force acting on the door body or first part 4. Therefore, when the decal 5 is removed from the door body 4, the adhesive 5 can be easily removed from the body 4. This is also true when the adhesive 6 consists only of an adhesive containing a foaming agent, e.g., the first adhesive layer 8 shown in FIG. 5.

So long as the adhesion force acting between the door body 4 and the adhesive 6 is weaker than the adhesion force acting between the decal S and the adhesive 6, the configuration shown in FIG. 5 allows the decal 5 to be peeled off without leaving substantially any adhesive 6 on the door body 4. If the adhesion force acting between the door body 4 and the adhesive 6 is great, the entire adhesive 6 may be left on the door body 4 when the decal 5 is peeled off. Even in such a condition, because the adhesion force between the first adhesive layer 8 and the door body 4 has been noticeably reduced by the heat, the adhesive 6 left on the door body 4 can be easily removed from the body 4 by, e.g., hand. In this manner, even with this second example, it is possible to facilitate the recycling of the first part.

The adhesive whose adhesion force decreases when illuminated by ultraviolet rays may advantageously be implemented by, e.g., SK Dyne SW-2 (trade name) available from Soken Chemicals (Japan).

It will be seen from the description of the thickness of the adhesive 6 that in all the sections included in the drawings show the thickness of the decal 5 and that of the adhesive 6 in an enlarged scale in order to facilitate an understanding.

In the configuration shown in FIG. 5, the adhesive 6 has the first adhesive layer 8 adhering to the door body or first part 4 and the second adhesive layer 9 adhering to the decal or second part 5. If only the first adhesive layer 8 is of the kind reducing its adhesion force acting on the first part when subjected to at least one of preselected heat and a preselected electromagnetic wave, substantially the entire adhesive 6 remains on the decal 5 when the decal 5 is peeled off the door body 4 after the application of the heat T, as shown in FIG. 5. Stated another way, the adhesive 6 substantially does not remain on the door body 4. This is the second example.

As stated above, the second example allows the adhesive 6 to remain on the second part without fail and thereby facilitates the recycling operation. The second example is practicable even with an adhesive lacking the substrate 7 shown in FIG. 5. This advantage is achievable even when the adhesive 6 or the first adhesive layer 8 is of the kind reducing its adhesion force acting on the first part when subjected to at least one of a magnetic force and an external force.

In the first and second examples, use may be made of an adhesive of the kind exerting a greater adhesion force within itself than on the door body or first part 4. Then, when the decal or second part 5 is peeled off the door body or first part 4, such a kind of adhesive is prevented from being torn off at its intermediate portion in the thicknesswise direction when left on one of the parts 4 and 5 or from being partly left on the first part 4. Specifically, when the adhesion force between the adhesive 6 and the decal 5 is greater than the adhesion force between the adhesive 6 and the door body 4, substantially the entire adhesive 6 remains on the decal 5 when the decal 5 is peeled off. Conversely, when the former adhesion force is smaller than the latter adhesion force, substantially the entire adhesive 6 remains on the door body 4 when the decal 5 is peeled off. Even the adhesive 6 left on the door body 4 can be easily peeled off because the adhesive 6 exerts a greater adhesion force within itself than on the door body 4. The adhesive 6 partly left on the door body 4 or torn off at the above-mentioned portion and partly left on the body 4 would be difficult to remove.

Figure 6:
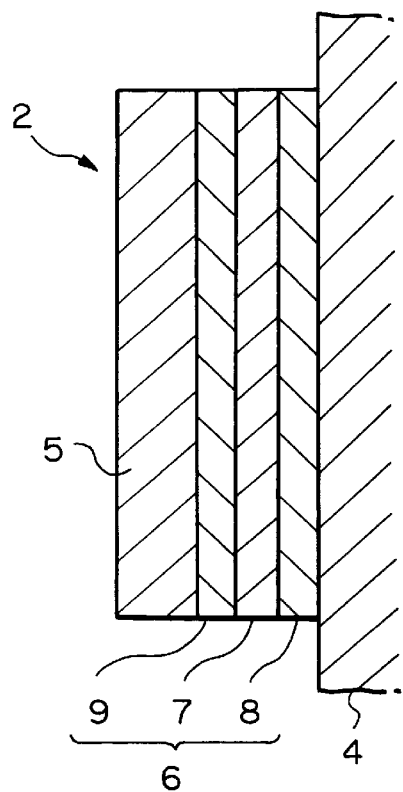
FIG. 6 is a section showing another specific adhesive.

In the first and second examples, assume that the adhesive 6 exerts a smaller adhesion force on the door body or first part 1 than on the decal or second part 5. Then, when the decal 5 is peeled off the door body 4, the adhesive 6 is effectively prevented from remaining on the body 4. This further facilitates the operation for recycling the door body 4. For example, as shown in FIG. 6, assume that the adhesive 6 consists of the sheet-like substrate 7 implemented by a piece of unwoven cloth, and the first and second adhesive layers 8 and 9. Then, the materials constituting the two adhesive layers 8 and 9 will be so selected as to exert a smaller adhesion force on the door body 4 than on the decal 5.

A third example to be described uses adhesion force reducing means for reducing the adhesion force acting between the door body or first part 4 and the adhesive 6, so that the adhesive 6 can be removed from the body 4 more easily. The third example may advantageously be combined with either one of the first and second examples.

Figure 7:
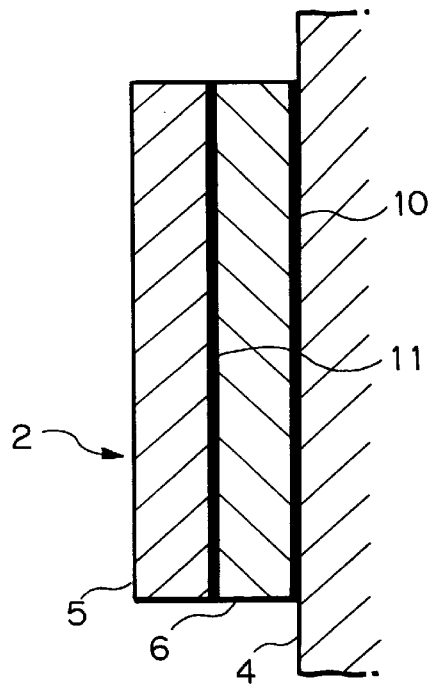
FIG. 7 is a section showing an example in which a parting agent and an affinity agent are used as adhesion force reducing means and adhesion force increasing means, respectively.

FIG. 7 shows a specific configuration of the adhesion force reducing means. As shown, a parting agent 10 intervenes between the door body or first part 4 and the adhesive 6. The parting agent 10 is implemented by silicone oil. With this simple implementation, it is possible to enhance the parting ability of the adhesive 6 from the first part. This is a fourth example.

Figure 8:
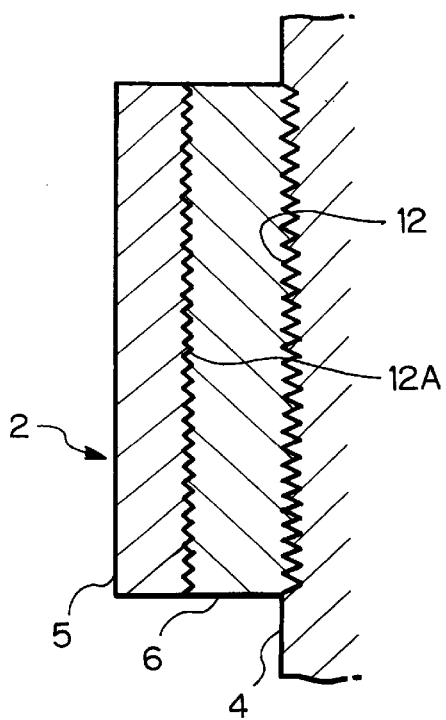
FIG. 8 is a section showing adhesion force reducing means and adhesion force increasing means implemented by roughening.

Alternatively, the adhesion force reducing means may be implemented as a number of projections and recesses formed in the surface of the door body or first part 4. The recesses successfully reduce the area over which the adhesive 6 and door body 4 contact, and therefore the adhesion force acting between the adhesive 6 and the body 4. This is a fifth example. For example, as shown in FIG. 8, the surface portion 12 of the door body 4 to contact the adhesive 6 may be roughened. In this configuration, the adhesive 6 contacts the tips of projections produced by the roughening operation. This allows the decal 5 to be easily peeled off the door body 4.

A sixth example to be described uses adhesion force increasing means for increasing the adhesion force acting between the adhesive 6 and the decal or second part 2. The adhesion force increasing means allows the adhesive 6 to remain on the decal 5 more positively when the decal 5 is peeled off the door body 4. The sixth example may advantageously be combined with any one of the first to fifth examples.

As shown in FIG. 7, the adhesion force increasing means may be implemented as an affinity agent 11 intervening between the decal 5 and the adhesive 6. This increases the adhesion strength between the decal 5 and the adhesive 6 with a simple implementation. Alternatively, to increase the area over which the surface of the decal 5 and the adhesive 6 contact, a number of projections and recesses may be formed in the surface of the decal 5. This is a simpler implementation for increasing the adhesion strength between the decal 5 and the adhesive and is a seventh example. For example, as shown in FIG. 8, the surface 12A of the decal to contact the adhesive 6 is roughened in order to form projections and recesses. The adhesive 6 is buried in the recesses of the surface 12A for the above purpose.

In FIG. 8, the roughened surface 12 of the door body 4 includes high projections contacting the adhesive 6 only at their tips. By contrast, the roughened surface 12A of the decal 5 includes low projections; the adhesive 6 penetrates into the recesses and therefore contacts the decal 5 over an increased area. The roughened surfaces 12A and 12A implement the projections and recesses of the five and seventh examples and constitute an eighth example.

Figure 9:
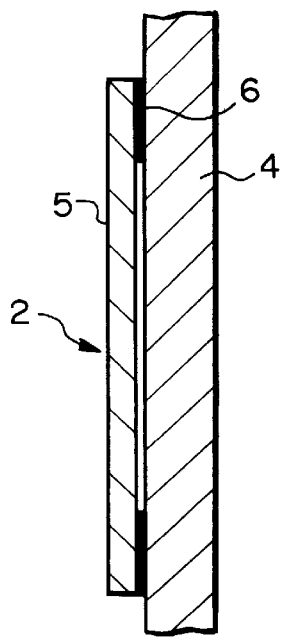
FIG. 9 is a view similar to FIG. 2, showing an example in which the adhesive is provided only in a part of the surfaces of the door body and decal contacting each other.
Figure 10:
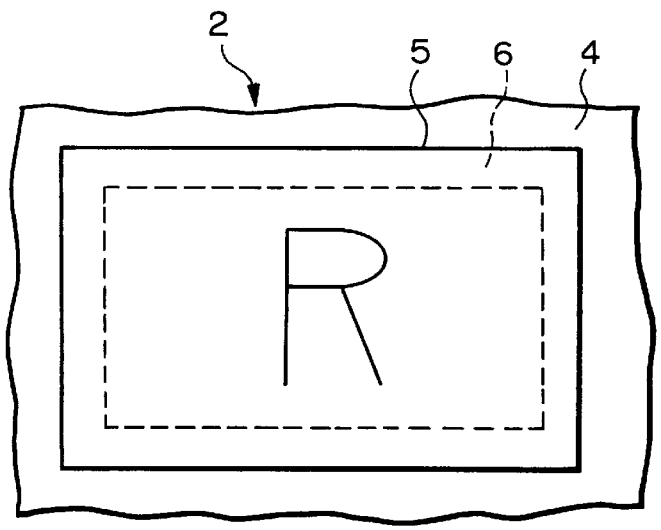
FIG. 10 is a front view of the decal shown in FIG. 9.

As shown in FIGS. 9 and 10, the adhesive 6 may intervene only a part of the surface of the door body or first part 4 and a part of the surface of the decal or second part 5 contacting each other. This allows the decal 5 to be peeled off the door body 4 more easily at the time of removal or afterwards. This is a ninth example.

In the ninth example, it is more advantageous to provide the adhesive 6 along the entire edges of the surfaces of the door body 4 and decal 5 facing each other. The adhesive 6 extends along the above edges with a preselected width. This is a tenth example. Specifically, although the adhesive 6 provided only in a part of the surfaces of the door body 4 and decal 5 facing each other promotes the easy removal of the adhesive 6 from the body 4, it is apt to lower the adhesion strength between the body 4 and the decal 5. In light of this, the adhesive 6 is provided over the entire edges of the decal 5, as in the tenth example. As a result, not only the decal 5 is prevented from coming off at its edges during the ordinary use of the front door 2, but also the adhesive 6 can be easily removed from the door body 4.

The ninth and tenth examples may each be combined with any one of the other examples shown and described.

Assume that any one of the first to tenth examples includes the sheet-like substrate 7 shown in FIG. 6 and implemented by a piece of unwoven cloth. Then, the substrate 7 may advantageously be made of a material soluble in the material of the first part. When the front door 2 is bodily shredded and melted to produce a new molding, the substrate 7 made of the above material desirably dissolves in the material of the other part. This is particularly useful to enhance the characteristics of the new molding and is an eleventh embodiment.

Further, assume that the adhesive 6 of any one of the first to tenth examples is implemented by a material soluble in the material of the door body or first part 4. Then, when the front door 2 is bodily shredded and melted to produce a new molding, the adhesive 6 is entirely dissolves in the material of the other part. This further enhances the characteristics of the new molding. The adhesive 6 for connecting the door body 4 and decal 5 may be implemented by PMMA desirably soluble in, e.g., PS, PPE, ABS or similar resin. Therefore, when PMMA is used for the adhesive 6, the door body 4 and decal 5 should preferably be formed of PS, PPE, ABS or similar resin. This is a twelfth example.

Figure 11:
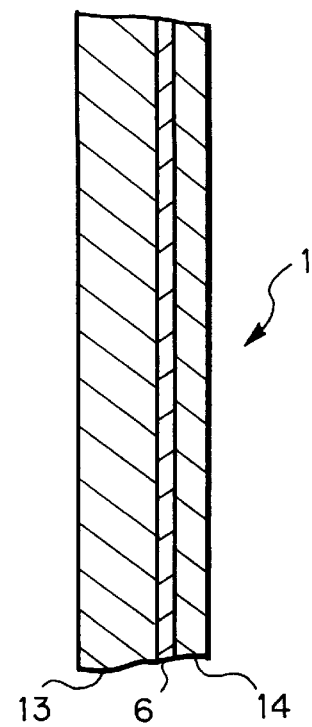
FIG. 11 is a section alone line XI—XI of FIG. 1.

The above examples have concentrated on a first part implemented as the door body 4 and a second part implemented as the decal 5 and connected together by the adhesive 6 to constitute an article in the form of the front door 2. The present invention is, of course, applicable to any other article included in the copier, e.g., the casing 1 or the cover plate 3 shown in FIG. 1. As shown in FIG. 1, a display section 16 including an LC (Liquid Crystal) panel and LEDs (Light Emitting Diodes) is provided on the top of the copier. The display section 16 and a printed circuit, not shown, associated therewith are accommodated in a case, not shown. To protect the display section 16, a transparent sheet 17 which may be about 1 mm thick is adhered to the top of the above case. The transparent sheet 17 and case to which the sheet 17 is adhered may be used as the second part and first part, respectively. FIG. 11 which is a section along line XI—XI of FIG. 1 shows the casing 1 made up of a casing body or first part 13 and a sound-absorbing foam material or second part 14 adhered to the body 13 by the adhesive 6. The present invention is similarly applicable to such a casing or recyclable article 1.

The examples stated earlier, particularly the first to twelfth examples, are advantageously applicable to the front door 2 or the casing 1 whose door body 4 or casing body 13 is the first or major part and whose decal 5 or foam material 14 is the second or minor material. This is because even when the second part is peeled off the first part and if the adhesive is left on the second part, it can be readily discarded. This is a thirteenth example.

Figure 12:
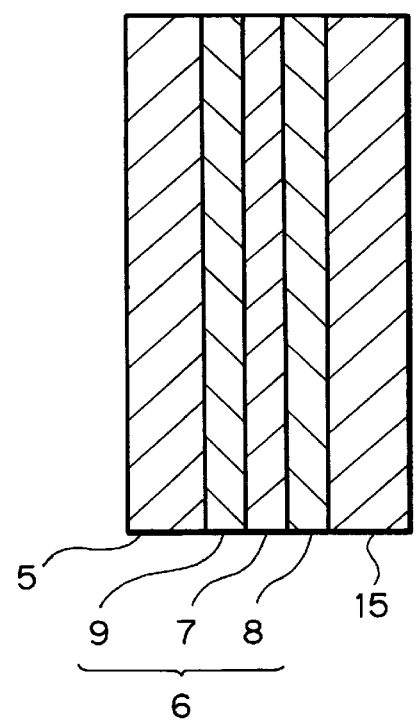
FIG. 12 is a section showing a sheet-like member implemented by the decal.

The decal or second part 5 shown in FIG. 5 is adhered to the door body or first part 4. As shown in FIG. 12, before the second part is adhered to the first part, one side of the adhesive 6 is adhered to the second part while a parting sheet 15 is adhered to the other side of the second part. After the parting sheet 15 has been peeled off the side of the adhesive 6, that side of the adhesive 6 is adhered to the door body 4.

The adhesive 6 shown in FIG. 12 has the same configuration as the adhesive 6 shown in FIG. 5. Specifically, the decal or sheet-like member 5 shown in FIG. 12 is adhered to a part formed of a thermoplastic resin, e.g., the door body 4. The decal 5 is formed of a thermoplastic resin soluble in the resin of the door body 4. The adhesive 6 is of the kind reducing its adhesion force acting on a part when subjected to at least one of preselected heat and a preselected electromagnetic wave (e.g. ultraviolet rays). When such a sheet-like member is adhered to a part, it can be easily removed from the part at the time of recycling. This is a fourteenth example. If desired, use may be made of an adhesive of the kind reducing its adhesion force when subjected to at least one of a magnetic force and an external force.

It should be noted that the present invention is applicable not only to office equipments, equipments for public use and other electronic equipments, but also to buildings, railroads, automotive vehicles, ships, toys, etc.

In summary, in accordance with the present invention, when a recyclable article is reclaimed to produce a new molding, the molding can be provided with desirable characteristics. When a first part included in the recyclable article is reused, adhesive can be easily and surely removed from the first part, This allows the article to be recycled at a low cost. Even when the adhesive is left on a second part when the second part is peeled off the first part, the adhesive can be discarded as it is. By adhering a sheet-like member to a part of an article, it is possible to recycle the article easily.

Various modifications will become possible for those skilled in the art after receiving the teachings of the present disclosure without departing from the scope thereof.

What is claimed is:

1. A recyclable article comprising:
   a first part; and
   a second part adhered to said first part by an adhesive;
      said first part and said second part being formed of thermoplastic resins soluble in each other;
      said adhesive being of a kind reducing an adhesion force thereof acting on said first part when subjected to at least one of heat and an electromagnetic wave such that the adhesive remains on the second part but substantially does not remain on said first part when said second part is removed from said first part;
      wherein said first part forms a portion of an electronic apparatus and said second part is an attachment adhered to said first part by said adhesive.

2. A recyclable article as claimed in claim 1, wherein said adhesive comprises a two-sided adhesive sheet consisting of a substrate and adhesive layers provided on both sides of said substrate, said substrate being formed of a material soluble in the thermoplastic resin forming said first part.

3. A recyclable article as claimed in claim 1, wherein said adhesive is entirely formed of a material soluble in the thermoplastic resin forming said first part.

4. A recyclable article comprising:
   a first part; and
   a second part adhered to said first part by an adhesive;
      said first part and said second part being formed of thermoplastic resins soluble in each other;
      said adhesive comprising a first and a second adhesive layer adhering to said first part and said second part, respectively, said first adhesive layer being of a kind reducing an adhesion force thereof acting on said first part when subjected to at least one of heat and an electromagnetic wave such that the adhesive remains on said second part substantially does not remain on said first part when said second part is removed from said first part;
      wherein said first part forms a portion of an electronic apparatus and said second part is an attachment adhered to said first part by said adhesive.

5. A recyclable article as claimed in claim 4, wherein said adhesive comprises a two-sided adhesive sheet consisting of a substrate and adhesive layers provided on both sides of said substrate, said substrate being formed of a material soluble in the thermoplastic resin forming said first part.

6. A recyclable article as claimed in claim 4, wherein said adhesive is entirely formed of a material soluble in the thermoplastic resin forming said first part.

7. A recyclable article comprising:

a first part forming a portion of an electronic apparatus;

a second part adhered to said first part by an adhesive; and adhesion force reducing means for reducing an adhesion force acting between said first part and said adhesive such that the adhesive remains on said second part but substantially does not remain on said first part when said second part is removed from said first part;

said first part and said second part being formed of thermoplastic resins soluble in each other.

8. A recyclable article as claimed in claim 7, wherein said adhesion force reducing means comprises a parting agent intervening between said first part and said adhesive.

9. A recyclable article as claimed in claim 7, wherein said adhesion force reducing means comprises:

recesses formed in a surface of said first part such that portions of the surface of said first part within said recesses are spaced apart from a surface of said adhesive facing said surface of said first part.

10. A recyclable article as claimed in claim 9, wherein said projections and recesses are formed by roughening.

11. A recyclable article as claimed in claim 9, wherein said adhesive comprises a two-sided adhesive sheet consisting of a substrate and adhesive layers provided on both sides of said substrate, said substrate being formed of a material soluble in the thermoplastic resin forming said first part.

12. A recyclable article as claimed in claim 7, wherein said adhesive is entirely formed of a material soluble in the thermoplastic resin forming said first part.

13. A recyclable part comprising:

a first part forming a portion of an electronic apparatus;

a second part adhered to said first part by an adhesive; and adhesion force increasing means for increasing an adhesion force acting between said second part and said adhesive such that the adhesive remains on said second part but substantially does not remain on said first part when said second part is removed from said first part;

said first part and said second part being formed of thermoplastic resins soluble in each other.

14. A recyclable part as claimed in claim 13, wherein said adhesion increasing means comprises:

projections formed on a surface of said second part such that a surface of said adhesive facing said surface of said second part conforms to the projections.

15. A recyclable part as claimed in claim 14, wherein said projections and recesses are formed by roughening said second part.

16. A recyclable article as claimed in claim 3, wherein said adhesive comprises a two-sided adhesive sheet consisting of a substrate and adhesive layers provided on both sides of said substrate, said substrate being formed of a material soluble in the thermoplastic resin forming said first part.

17. A recyclable article as claimed in claim 13, wherein said adhesive is entirely formed of a material soluble in the thermoplastic resin forming said first part.

18. A recyclable article comprising:

a first part forming a portion of an electronic apparatus; and a second part adhered to said first part by an adhesive;

said first part and said second part being formed of thermoplastic resins soluble in each other;

said adhesive existing on a surface of said second part and only on a portion of a surface of said first part, said portion being smaller than the surface of said first part such that the adhesive remains on said second part but substantially does not remain on said first part when said second part is removed from said first part.

19. A recyclable article as claimed in claim 18, wherein said adhesive extends over all edges of said surface of said first part and said surface of said second part.

20. A recyclable article as claimed in claim 18, wherein said adhesive comprises a two-sided adhesive sheet consisting of a substrate and adhesive layers provided on both sides of said substrate, said substrate being formed of a material soluble in the thermoplastic resin forming said first part.

21. A recyclable article as claimed in claim 18, wherein said adhesive is entirely formed of a material soluble in the thermoplastic resin forming said first part.

* * * * *